(12) United States Patent
Li et al.

(10) Patent No.: US 12,186,612 B2
(45) Date of Patent: Jan. 7, 2025

(54) TENSION FORCE STEPLESS ADJUSTMENT COUNTERWEIGHT POWER GENERATING MECHANISM AND FITNESS EQUIPMENT WITH THE SAME

(71) Applicant: Shanghai Yinsheng Technology Co., Ltd., Shanghai (CN)

(72) Inventors: Yinsheng Li, Shanghai (CN); Pengfei Qin, Shanghai (CN)

( * ) Notice: Subject to any disclaimer, the term of this patent is extended or adjusted under 35 U.S.C. 154(b) by 0 days.

(21) Appl. No.: 17/613,955

(22) PCT Filed: Aug. 10, 2021

(86) PCT No.: PCT/CN2021/111794
§ 371 (c)(1),
(2) Date: Nov. 24, 2021

(87) PCT Pub. No.: WO2023/010595
PCT Pub. Date: Feb. 9, 2023

(65) Prior Publication Data
US 2024/0017113 A1    Jan. 18, 2024

(30) Foreign Application Priority Data
Aug. 2, 2021   (CN) .......................... 202110882159.0

(51) Int. Cl.
*A63B 21/00*    (2006.01)
*A63B 21/22*    (2006.01)
(Continued)

(52) U.S. Cl.
CPC ........ *A63B 21/00058* (2013.01); *A63B 21/22* (2013.01); *F03G 1/022* (2021.08); *F03G 1/08* (2013.01); *F03G 5/062* (2021.08)

(58) Field of Classification Search
CPC .............. A63B 21/00058; A63B 21/22; A63B 22/0605; A63B 22/00; A63B 23/03516;
(Continued)

(56) References Cited

U.S. PATENT DOCUMENTS 4,184,678 A  *  1/1980  Flavell ................. A63B 21/153
                                                    482/901
4,261,562 A  *  4/1981  Flavell ............... A63B 21/0053
                                                    482/6
(Continued)

FOREIGN PATENT DOCUMENTS

CN         2312733 Y  * 10/1997  ........... A63B 21/005

*Primary Examiner* — Loan B Jimenez
*Assistant Examiner* — Andrew M Kobylarz

(57) ABSTRACT

The invention discloses a tension force stepless adjustment counterweight power generating mechanism and a fitness equipment with the same, comprising a pulling rope, a winding drum, a mounting seat, a central shaft, a spring, a generator, and a regulator; one end of the pulling rope is connected to the winding drum; a part of the pulling rope is wound on the outer peripheral wall of the winding drum; the winding drum is rotatably connected to the mounting seat; the outer end of the spring is connected to the winding drum, and the inner end thereof is connected to the mounting seat; the central shaft is rotatably arranged on the mounting seat. The mechanism organically combines the pulling force process with the power generation process, and uses a regulator to adjust the rotation damping of the generator motor shaft to adjust the pulling force in a disguised manner.

7 Claims, 2 Drawing Sheets

(51) Int. Cl.
*F03G 1/02* (2006.01)
*F03G 1/08* (2006.01)
*F03G 5/06* (2006.01)

(58) Field of Classification Search
CPC .......... A63B 22/0002; A63B 21/00196; A63B 22/0005; A63B 22/02; A63B 2022/0035; A63B 2220/30; A63B 2220/16; A63B 2220/34; A63B 21/0628; A63B 21/0058; A63B 2220/51; A63B 2220/13; F03G 1/022; F03G 1/08; F03G 5/062; A61H 1/001
See application file for complete search history.

(56) References Cited

U.S. PATENT DOCUMENTS

| | | | | |
|---|---|---|---|---|
| 4,595,081 A | * | 6/1986 | Parsons | F03G 1/08 |
| | | | | 251/129.11 |
| 2010/0151994 A1 | * | 6/2010 | Yeh | A63B 22/0605 |
| | | | | 482/4 |
| 2019/0168053 A1 | * | 6/2019 | Garsdean | A63B 71/0622 |
| 2023/0332579 A1 | * | 10/2023 | Li | F03G 1/08 |

\* cited by examiner

TENSION FORCE STEPLESS ADJUSTMENT COUNTERWEIGHT POWER GENERATING MECHANISM AND FITNESS EQUIPMENT WITH THE SAME

BACKGROUND OF THE INVENTION

1. Field of the Invention

The invention relates to the field of fitness equipment, in particular to a tension force stepless adjustment counterweight power generating mechanism and a fitness equipment with the same.

2. Description of the Related Art

Rally fitness equipment usually has a counterweight structure. The existing counterweight structure is generally a counterweight, that is, several counterweights are stacked in a fixed chute, and two fixed guide rails are provided in the chute; each counterweight is put on the guide rail and can slide along the guide rail; then there is a tension rod passing through all the counterweights from top to bottom, and there is a fixed pin hole on the tension rod corresponding to the pin hole in the middle of each counterweight. Pulling the tension rod to move up and down during fitness can achieve tension training, in which the bolt is inserted into the hole in the middle of the different counterweights and the corresponding hole on the tension rod to achieve the purpose of fixing the tension rod and the counterweight, which can realize the adjustment of the tension during the fitness process.

This structure has many shortcomings. For example, this kind of counterweight structure requires a lot of pre-installed counterweights, which causes the weight of the exercise machine itself to be very large, and the tension adjustment process is cumbersome. It needs to be operated in the static state of the exercise machine. During the operation process, the adjusting plug is inserted into the counterweight through the tension rod to achieve the purpose of fixing. Each adjustment process requires plugging and unplugging adjustments, which will cause problems such as difficult insertion of the plug and high friction during the insertion process; moreover, the weight of the existing fitness equipment counterweight is fixed, and the tension can only be adjusted to a fixed value; it cannot adjust any amount of pulling force, cannot meet the exact adjustment of the pulling force range during the fitness process, etc., and cannot collect the various kinetic energy generated during the fitness process. Therefore, it is necessary to design a new type of adjustment mechanism.

SUMMARY OF THE INVENTION

The invention aims to solve at least one of the technical problems existing in the prior art. To this end, one object of the invention is to provide a tension force stepless adjustment counterweight power generating mechanism and a fitness equipment with the same.

The technical solutions of the invention are: a tension force stepless adjustment counterweight power generating mechanism, comprising a pulling rope, a winding drum, a mounting seat, a central shaft, a spring, a generator, and a regulator;

one end of the pulling rope is connected to the winding drum; a part of the pulling rope is wound on the outer peripheral wall of the winding drum;

the winding drum is rotatably connected to the mounting seat; the outer end of the spring is connected to the winding drum, and the inner end thereof is connected to the mounting seat;

the central shaft is rotatably arranged on the mounting seat; the winding drum is unidirectionally rotatably sleeved on the central shaft so that when the pulling rope drives the winding drum to rotate, the central shaft rotates with the winding drum and the spring is wound up at the same time;

the central shaft is connected to the motor shaft of the generator; the regulator is connected to the generator.

Further, the outer peripheral wall of the winding drum is provided with a spiral groove; the pulling rope can be stored in the spiral groove.

Further, a one-way bearing is provided between the winding drum and the central shaft.

Further, the end surface of one axial end of the winding drum is recessed inwardly along the axial direction of the winding drum to form an annular first step groove; the groove surface of the first step groove is recessed inwardly along the axial direction of the winding drum to form an annular second step groove; the groove surface of the second step groove is recessed inwardly along the axial direction of the winding drum to form an annular third step groove;

the spring is arranged in the first step groove; the one-way bearing is arranged in the second step groove and is sleeved on the central shaft; a first rolling bearing is arranged in the third step groove and is sleeved on the central shaft.

Further, the mounting seat comprises a protective cover and a connector; the central shaft is rotatably arranged on the connector; the protective cover is covered on the winding drum and is connected to the connector; the protective cover is provided with a rope passing groove through which the pulling rope can pass; the spring is respectively connected to the protective cover and the winding drum.

Further, the protective cover comprises a lid body, a cover body and a flanging; the cover body is annular; the cover body is provided with the rope passing groove; the cover body is covered on the winding drum; one axial end of the cover body is provided with the lid body, and the outer peripheral edge of the other axial end thereof is provided with the flanging; the flanging is detachably connected to the connector; the inner side of the lid body is provided with a supporting block; the spring is sleeved on the supporting block; the outer end of the spring is connected to the inner peripheral wall of the winding drum, and the inner end thereof is connected to the supporting block.

Further, it further comprises an acceleration mechanism; the acceleration mechanism is arranged between the central shaft and the generator.

Further, the acceleration mechanism comprises a planetary accelerator; the input shaft of the planetary accelerator is connected to the central shaft; the output gear of the planetary accelerator is connected to the motor shaft of the generator.

Further, it further comprises an energy storage battery; the energy storage battery is connected to the regulator.

Another object of the invention is to provide a fitness equipment, comprising the above tension force stepless adjustment counterweight power generating mechanism.

Compared with the prior art, the invention has the following advantageous effects:

Unlike the prior art exercise equipment with counterweights that uses bolts to adjust the pulling force, the inventor of the invention took a different approach and creatively designed a new type of pulling force adjusting mechanism. The mechanism organically combines the pulling force process with the power generation process, and uses a regulator to adjust the rotation damping of the generator motor shaft to adjust the pulling force in a disguised manner. In this way, the invention can not only realize the stepless adjustment of the tension, improve the flexibility of the adjustment of the tension, and meet the different training needs of different users, but also can convert the chemical energy consumed by the human body during the exercise into electrical energy use, which avoids energy waste, and kills two birds with one stone. The whole adjustment process is simple and convenient to use, and there is no need to use a counterweight in this structure, which greatly reduces the weight of the device, makes the device structure compact, and is convenient for transportation and installation.

The additional aspects and advantages of the invention will be partly given in the following description, and partly will become obvious from the following description, or be understood through the practice of the invention.

BRIEF DESCRIPTION OF THE DRAWINGS

In order to explain the embodiments of the invention or the technical solutions in the prior art more clearly, the drawings that need to be used in the description of the embodiments or the prior art will be introduced hereinafter. Obviously, the drawings in the following description are only some embodiments of the invention. For those of ordinary skill in the art, other drawings may be obtained from these drawings without creative efforts

Figure 1:
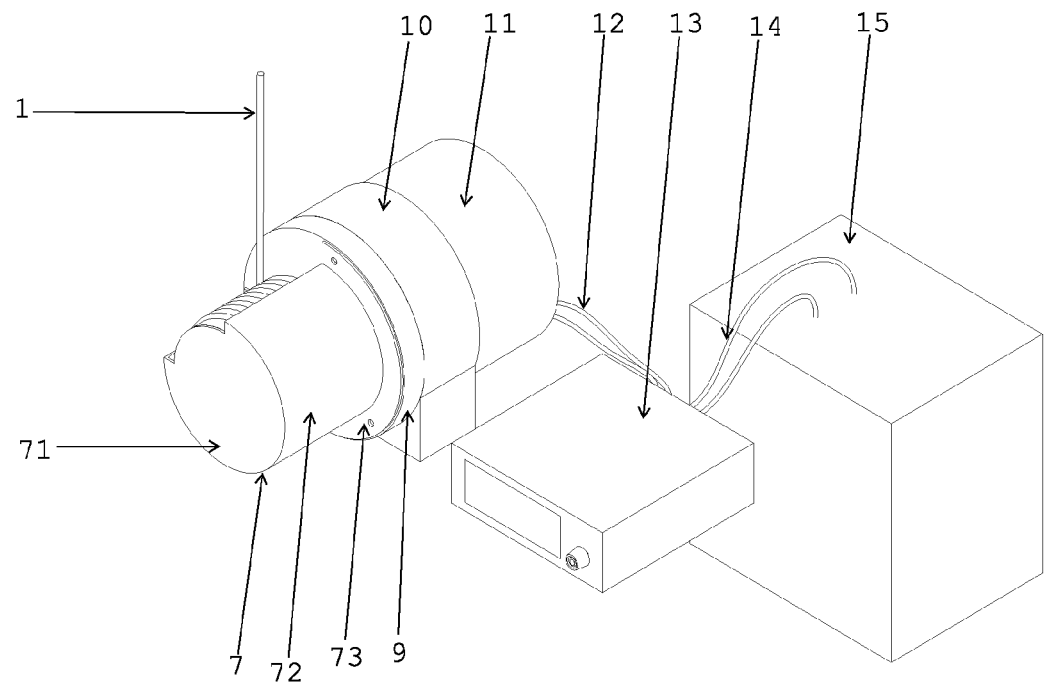
FIG. 1 is a perspective view of the invention.

REFERENCE SIGNS 1 refers to the pulling rope; 2 refers to the winding drum; 3 refers to the one-way bearing; 4 refers to the central shaft; 5 refers to the first rolling bearing; 6 refers to the spring; 7 refers to the protective cover; 71 refers to the lid body; 72 refers to the cover body; 73 refers to the flanging; 8 refers to the second rolling bearing; 9 refers to the connector; 10 refers to the planetary accelerator; 11 refers to the generator; 12 refers to the generator wire; 13 refers to the regulator; 14 refers to the energy storage wire; 15 refers to the battery; 16 refers to the adjustment knob-; 17 refers to the first step groove; 18 refers to the second step groove; 19 refers to the third step groove; 20 refers to the rope passing groove; 21 refers to the supporting block.

DETAILED DESCRIPTION OF THE PREFERRED EMBODIMENTS

In order to make the objectives, technical solutions, and advantages of the embodiments of the invention clearer, the technical solutions in the embodiments of the invention will be described clearly and completely hereinafter with reference to the drawings in the embodiments of the invention. Obviously, the described embodiments are part of the embodiments of the invention, rather than all of the embodiments. Based on the embodiments of the invention, all other embodiments obtained by those of ordinary skill in the art without creative work shall all fall within the protection scope of the invention.

The embodiments of the invention are described in detail hereafter. Examples of the embodiments are shown in the accompanying drawings, in which the same or similar reference numerals indicate the same or similar elements or elements with the same or similar functions. In the description of the invention, it should be understood that the orientation or positional relationship indicated by the terms "upper", "lower", "front", "back, "left", "right", "inner", "outer", "vertical", "circumferential", "radial", "axial", etc. are based on the orientation or positional relationship shown in the drawings, and is only for the convenience of describing the invention and simplifying the description, but not indicate or imply that the pointed device or element must have a specific orientation, be constructed and operated in a specific orientation, and therefore cannot be understood as a limitation of the invention.

In the invention, unless otherwise clearly defined and limited, the terms "installed", "connected", "fixed" and other terms should be interpreted broadly; for example, it can be a fixed connection, a detachable connection or an integral connection; it can be a mechanical connection or an electrical connection; it can be a direct connection or an indirect connection through an intermediary, and it can be a connection between two components. For those of ordinary skill in the art, the specific meanings of the above terms in the invention can be understood according to specific circumstances.

In the description of the invention, "first feature" and "second feature" may include one or more of these features. In addition, the terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features.

Figure 2:
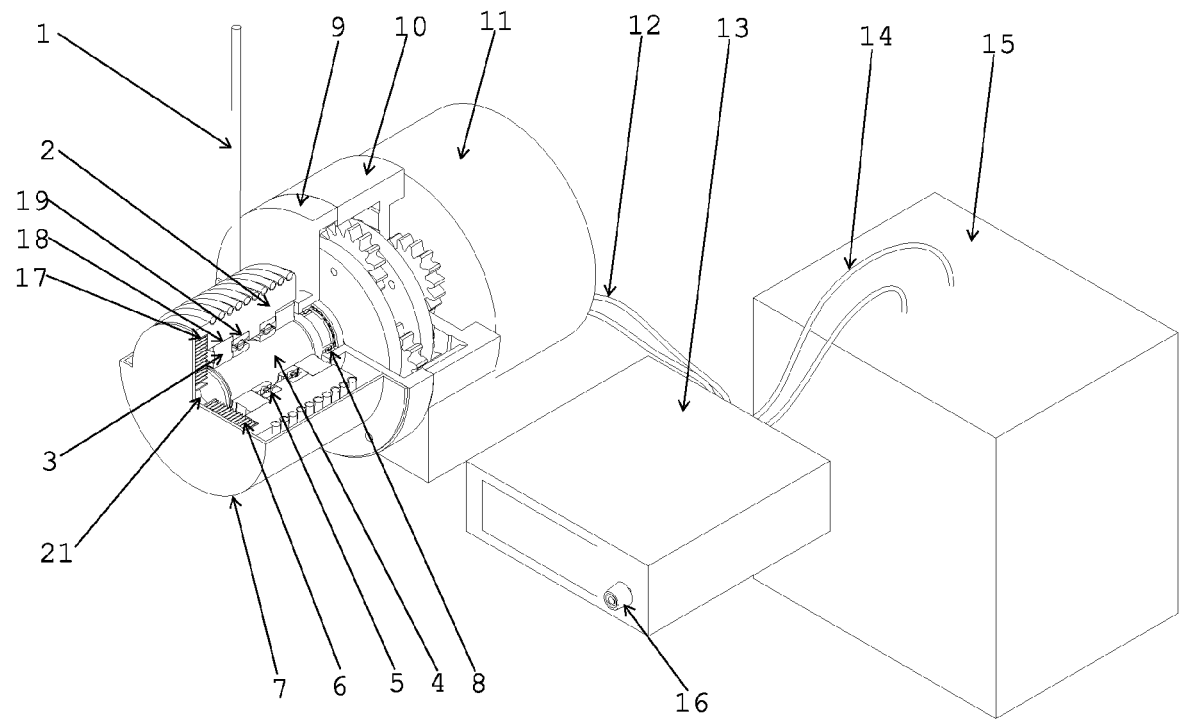
FIG. 2 is a cross-sectional perspective view of the invention.
Figure 3:
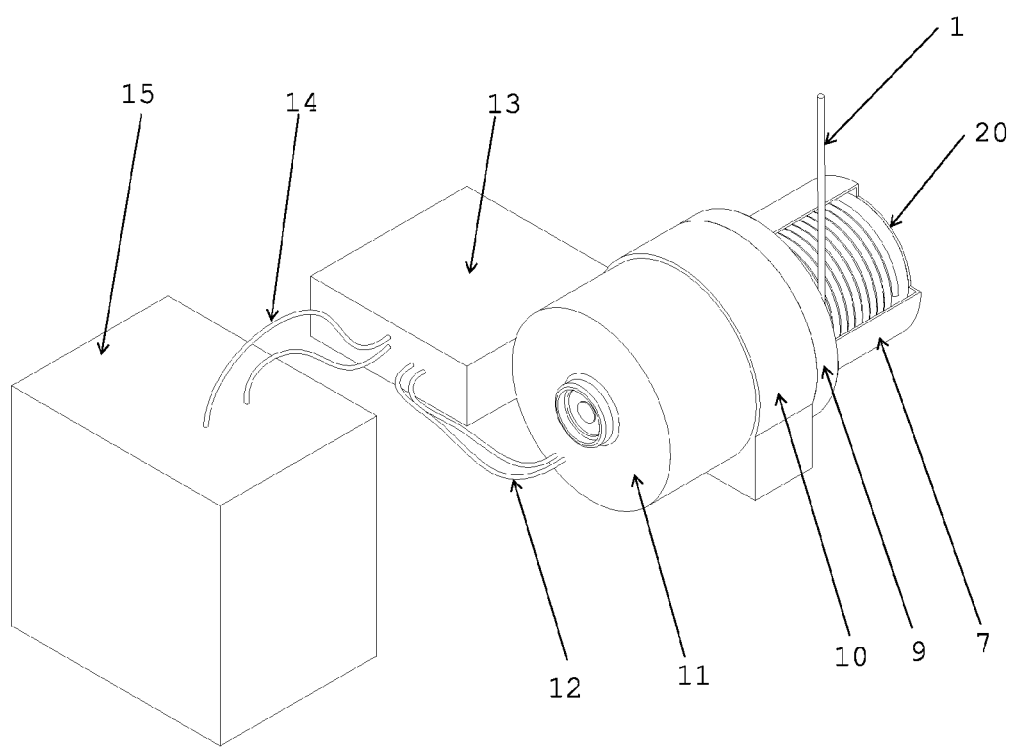
FIG. 3 is another perspective view of the invention.

With reference to FIG. 1 to FIG. 3, a tension force stepless adjustment counterweight power generating mechanism according to the invention is described hereinafter, comprising a pulling rope 1, a winding drum 2, a mounting seat, a central shaft 4, a spring 6, a generator 11, and a regulator 13; the regulator 13 mentioned here refers to the regulator 13 that can adjust the rotation damping of the motor shaft of the generator 11; the regulator 13 is provided with an adjustment knob 16. By turning the adjustment knob 16, the rotation damping of the motor shaft of the generator 11 can be adjusted.

As shown in FIG. 2 and FIG. 3, one end of the pulling rope 1 is connected to the winding drum 2; a part of the pulling rope 1 is wound on the outer peripheral wall of the winding drum 2; the winding drum 2 is rotatably connected to the mounting seat; the outer end of the spring 6 is connected to the winding drum 2, and the inner end thereof is connected to the mounting seat;

the central shaft 4 is rotatably arranged on the mounting seat; the winding drum 2 is unidirectionally rotatably sleeved on the central shaft 4 so that when the pulling rope 1 drives the winding drum 2 to rotate, the central shaft 4 rotates with the winding drum 2 and the spring 6 is wound up at the same time; the central shaft 4 is connected to the motor shaft of the generator 11; the regulator 13 is connected to the generator 11.

Specifically, the one-way rotation here means that when the winding drum 2 rotates relative to the central shaft 4, it can only be freely rotated in one direction, and locked in the opposite direction; when it can rotate freely, the winding drum 2 and the central shaft 4 do not affect each other, and when locked, the winding drum 2 and the central shaft 4 can rotate synchronously.

In practical applications, when the tension force pulls the pulling rope 1 to move, the force between the pulling rope 1 and the winding drum 2 will drive the winding drum 2 to rotate; at this time, the rotation direction of the winding drum 2 is locked with the central shaft 4. Therefore, during the rotation of the winding drum 2, it will not only wind up the spring 6, but also drive the central shaft 4 to rotate. Since the central shaft 4 is connected to the generator 11, when the central shaft 4 rotates, it can drive the generator 11 to generate electricity. In this process, the rotation damping of the motor shaft of the generator 11 can be adjusted by the regulator 13, and then fed back to the pulling rope 1, thus, the amount of the applied pulling force can be changed, so as to realize the stepless adjustment of the pulling force; when the tension is removed, the wound spring 6 starts to release the stored elastic potential energy, and the spring 6 drives the winding drum 2 to rotate in the reverse direction; at this time, the rotation direction of the winding drum 2 and the central shaft 4 are free to rotate, so the winding drum 2 will not drive the central shaft 4 to rotate, but only recovers the pulling rope 1 for resetting.

In summary, unlike the prior art exercise equipment with counterweights that uses bolts to adjust the pulling force, the inventor of the invention took a different approach and creatively designed a new type of pulling force adjusting mechanism. The mechanism organically combines the pulling force process with the power generation process, and uses a regulator 13 to adjust the rotation damping of the generator 11 motor shaft to adjust the pulling force in a disguised manner. In this way, the invention can not only realize the stepless adjustment of the tension, improve the flexibility of the adjustment of the tension, and meet the different training needs of different users, but also can convert the chemical energy consumed by the human body during the exercise into electrical energy use, which avoids energy waste, and kills two birds with one stone. The whole adjustment process is simple and convenient to use, and there is no need to use a counterweight in this structure, which greatly reduces the weight of the device, makes the device structure compact, and is convenient for transportation and installation.

The specific structure of the device will be described in detail hereinafter.

In the embodiment, as shown in FIG. 2, the outer peripheral wall of the winding drum 2 is provided with a spiral groove; the pulling rope 1 can be stored in the spiral groove, so that the pulling rope 1 is not easy to be messy.

In the embodiment, as shown in FIG. 2, a one-way bearing 3 is provided between the winding drum 2 and the central shaft 4, so that the one-way rotation of the winding drum 2 and the central shaft 4 can be realized.

In the embodiment, as shown in FIG. 2, the end surface of one axial end of the winding drum 2 is recessed inwardly along the axial direction of the winding drum 2 to form an annular first step groove; the groove surface of the first step groove is recessed inwardly along the axial direction of the winding drum 2 to form an annular second step groove; the groove surface of the second step groove is recessed inwardly along the axial direction of the winding drum 2 to form an annular third step groove; the spring 6 is arranged in the first step groove; the one-way bearing 3 is arranged in the second step groove and is sleeved on the central shaft 4; a first rolling bearing 5 is arranged in the third step groove and is sleeved on the central shaft 4. The provided step grooves mainly play a role of storing and positioning, and facilitates the installation of the spring 6 and the bearing.

In the embodiment, as shown in FIG. 2 and FIG. 3, the mounting seat comprises a protective cover 7 and a connector 9; the central shaft 4 is rotatably arranged on the connector 9 through a second rolling bearing 8; the protective cover 7 is covered on the winding drum 2 and is connected to the connector 9; the protective cover is provided with a rope passing groove through which the pulling rope can pass; the spring is respectively connected to the protective cover and the winding drum; the protective cover 7 is provided with a rope passing groove through which the pulling rope 1 can pass; the spring 6 is respectively connected to the protective cover 7 and the winding drum 2. The provided protective cover 7 can protect the mounting seat.

In the embodiment, as shown in FIG. 2, the protective cover 7 comprises a lid body, a cover body and a flanging; the cover body is annular; the cover body is provided with the rope passing groove; the cover body is covered on the winding drum 2; one axial end of the cover body is provided with the lid body, and the outer peripheral edge of the other axial end thereof is provided with the flanging; the flanging is detachably connected to the connector 9; the inner side of the lid body is provided with a supporting block; the spring 6 is sleeved on the supporting block; the outer end of the spring 6 is connected to the inner peripheral wall of the winding drum 2, and the inner end thereof is connected to the supporting block. The protective cover 7 and the connector 9 are detachably connected to facilitate the assembly and disassembly of the protective cover 7. The supporting block provided on the cover body of the protective cover 7 is convenient for installing the spiral spring 6.

In the embodiment, as shown in FIG. 2, it further comprises an acceleration mechanism; the acceleration mechanism is arranged between the central shaft 4 and the generator 11. The acceleration mechanism is used to increase the rotation speed of the motor shaft of the generator 11, so as to improve the power generation efficiency. In practical applications, the acceleration mechanism comprises a planetary accelerator 10; the input shaft of the planetary accelerator 10 is connected to the central shaft 4; the output gear of the planetary accelerator 10 is connected to the motor shaft of the generator 11. The connector 9 is connected to the shell of the planetary accelerator 10. Of course, the acceleration mechanism can be in other structural forms, which are not limited here.

In the embodiment, as shown in FIG. 2, it further comprises an energy storage battery 15; the energy storage battery 15 is connected to the regulator 13. The regulator 13 mainly plays a role of regulating and stabilizing the electric energy generated by the generator, so as to provide the energy storage battery 15 with stable energy storage conditions. In practical applications, the generator 11 and the regulator 13 are connected by a generator wire 12, and the energy storage battery 15 and the regulator 13 are connected by an energy storage wire 14. After the voltage generated by the generator 11 is adjusted to an appropriate value through the regulator 13, the electric energy is stored in the energy storage battery 15 through the energy storage wire 14 for use.

Another object of the invention is to provide a fitness equipment, comprising the above tension force stepless adjustment counterweight power generating mechanism.

It should be noted that in the description of this article, the term "tension force" refers to the external main force acting on the pulling rope 1. The force exerted on the pulling rope 1 can tighten the pulling rope 1 and pull the pulling rope 1 to move; therefore, "tension force cannot be simply understood as being caused by the action of the hand on the fitness equipment, because depending on the type of fitness equipment, it can also be caused by the action of the leg on the fitness equipment. Therefore, this application does not specifically limit the source of the tension force.

Although the embodiments of the invention have been shown and described, for those of ordinary skill in the art, it can be understood that various changes, modifications, and substitutions can be made to these embodiments without departing from the principle and spirit of the invention. The protection scope of the invention is defined by the appended claims and the equivalents thereof.

The invention claimed is:

1. A tension force stepless adjustment counterweight power generating mechanism, comprising a pulling rope, a winding drum, a mounting seat, a central shaft, a spring, a generator, and a regulator;

one end of the pulling rope is connected to the winding drum; a part of the pulling rope is wound on an outer peripheral wall of the winding drum;

the winding drum is rotatably connected to the mounting seat; an outer end of the spring is connected to the winding drum, and an inner end thereof is connected to the mounting seat;

the central shaft is rotatably arranged on the mounting seat; the winding drum is unidirectionally rotatably sleeved on the central shaft so that when the pulling rope drives the winding drum to rotate, the central shaft rotates with the winding drum and the spring is wound up at the same time;

the central shaft is connected to a motor shaft of the generator; the regulator is connected to the generator;

wherein a one-way bearing is provided between the winding drum and the central shaft; and an end surface of one axial end of the winding drum is recessed inwardly along the axial direction of the winding drum to form an annular first step groove; the groove surface of the first step groove is recessed inwardly along the axial direction of the winding drum to form an annular second step groove; the groove surface of the second step groove is recessed inwardly along the axial direction of the winding drum to form an annular third step groove;

the spring is arranged in the first step groove; the one-way bearing is arranged in the second step groove and is sleeved on the central shaft; a first rolling bearing is arranged in the third step groove and is sleeved on the central shaft.

2. The tension force stepless adjustment counterweight power generating mechanism according to claim 1, wherein the outer peripheral wall of the winding drum is provided with a spiral groove; the pulling rope is stored in the spiral groove.

3. The tension force stepless adjustment counterweight power generating mechanism according to claim 1, wherein the mounting seat comprises a protective cover and a connector; the central shaft is rotatably arranged on the connector; the protective cover covers the winding drum and is connected to the connector; the protective cover is provided with a rope passing groove through which the pulling rope can pass; the spring is respectively connected to the protective cover and the winding drum.

4. The tension force stepless adjustment counterweight power generating mechanism according to claim 3, wherein the protective cover comprises a lid body, a cover body and a flanging; the cover body is annular; the cover body is provided with the rope passing groove; the cover body is covered on the winding drum; one axial end of the cover body is provided with the lid body, and an outer peripheral edge of another axial end thereof is provided with the flanging; the flanging is detachably connected to the connector; an inner side of the lid body is provided with a supporting block; the spring is sleeved on the supporting block; the outer end of the spring is connected to an inner peripheral wall of the winding drum, and the inner end thereof is connected to the supporting block.

5. The tension force stepless adjustment counterweight power generating mechanism according to claim 1, wherein it further comprises an acceleration mechanism; the acceleration mechanism is arranged between the central shaft and the generator.

6. The tension force stepless adjustment counterweight power generating mechanism according to claim 5, wherein the acceleration mechanism comprises a planetary accelerator; an input shaft of the planetary accelerator is connected to the central shaft; an output gear of the planetary accelerator is connected to the motor shaft of the generator.

7. The tension force stepless adjustment counterweight power generating mechanism according to claim 1, wherein it further comprises an energy storage battery; the energy storage battery is connected to the regulator.

* * * * *